Jan. 11, 1949.  H. O. HEM  2,458,704
SPRING TESTING SCALES
Filed Oct. 31, 1944  4 Sheets-Sheet 1
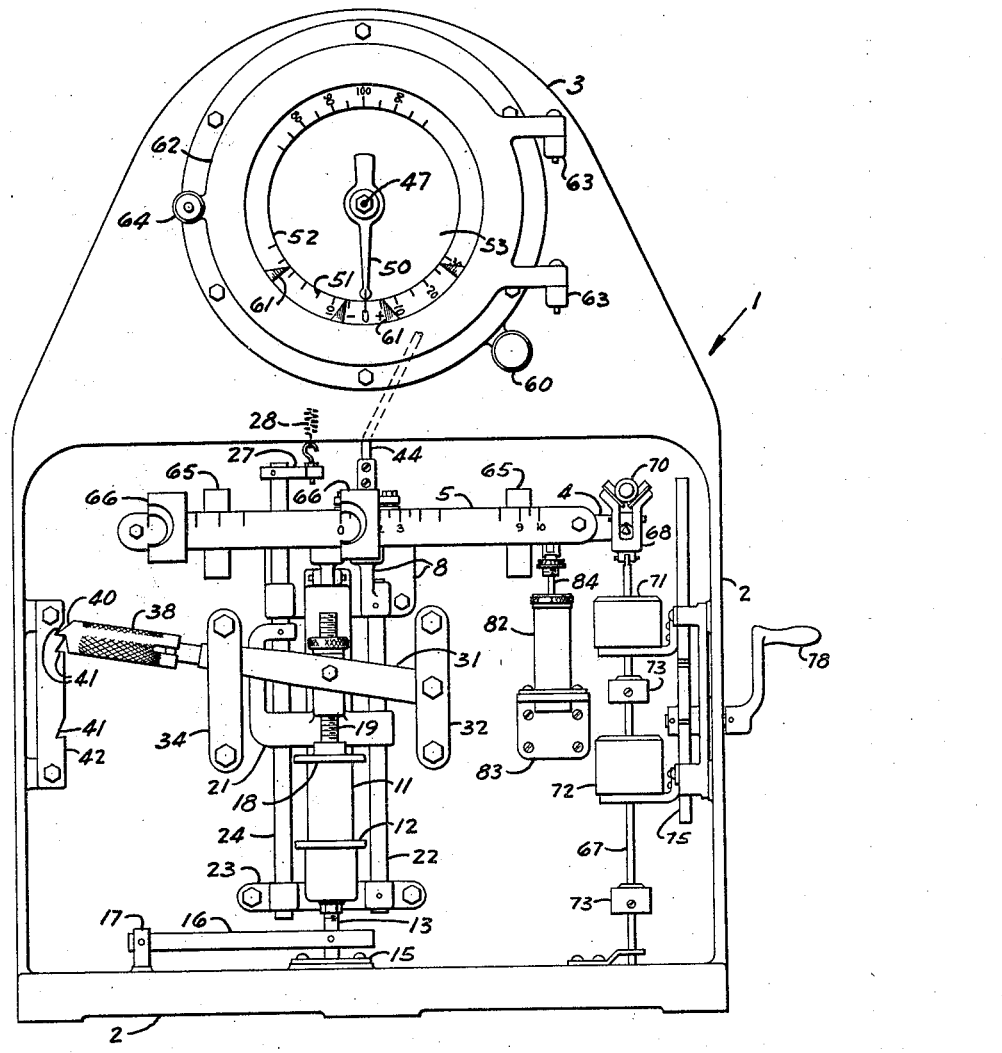
Fig. I
INVENTOR.
Halvor O. Hem
BY
Marshall & Marshall
ATTORNEYS Jan. 11, 1949. H. O. HEM 2,458,704
SPRING TESTING SCALES
Filed Oct. 31, 1944 4 Sheets-Sheet 2
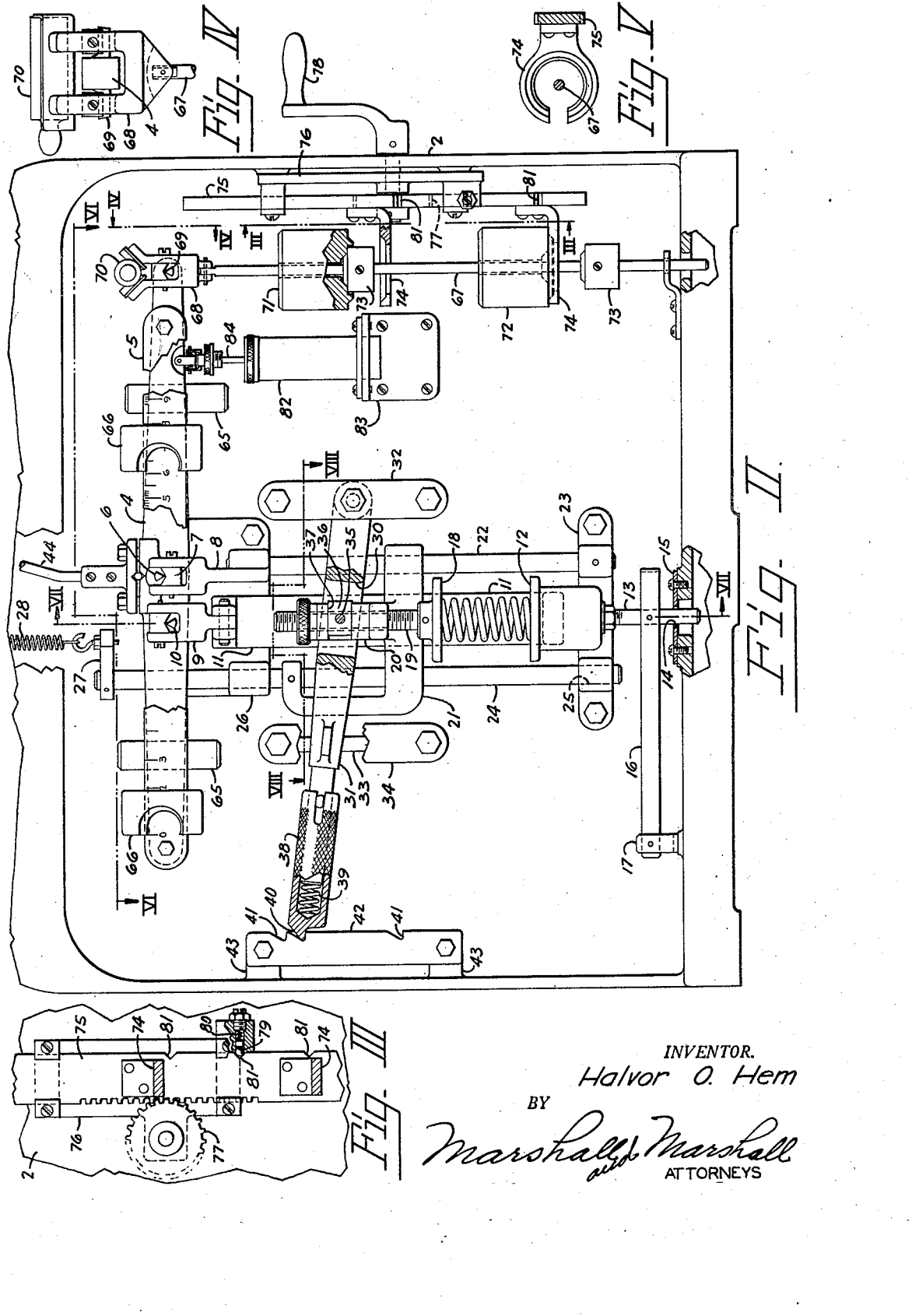
INVENTOR.
Halvor O. Hem
BY
Marshall & Marshall
ATTORNEYS Jan. 11, 1949.  H. O. HEM  2,458,704
SPRING TESTING SCALES
Filed Oct. 31, 1944  4 Sheets-Sheet 3
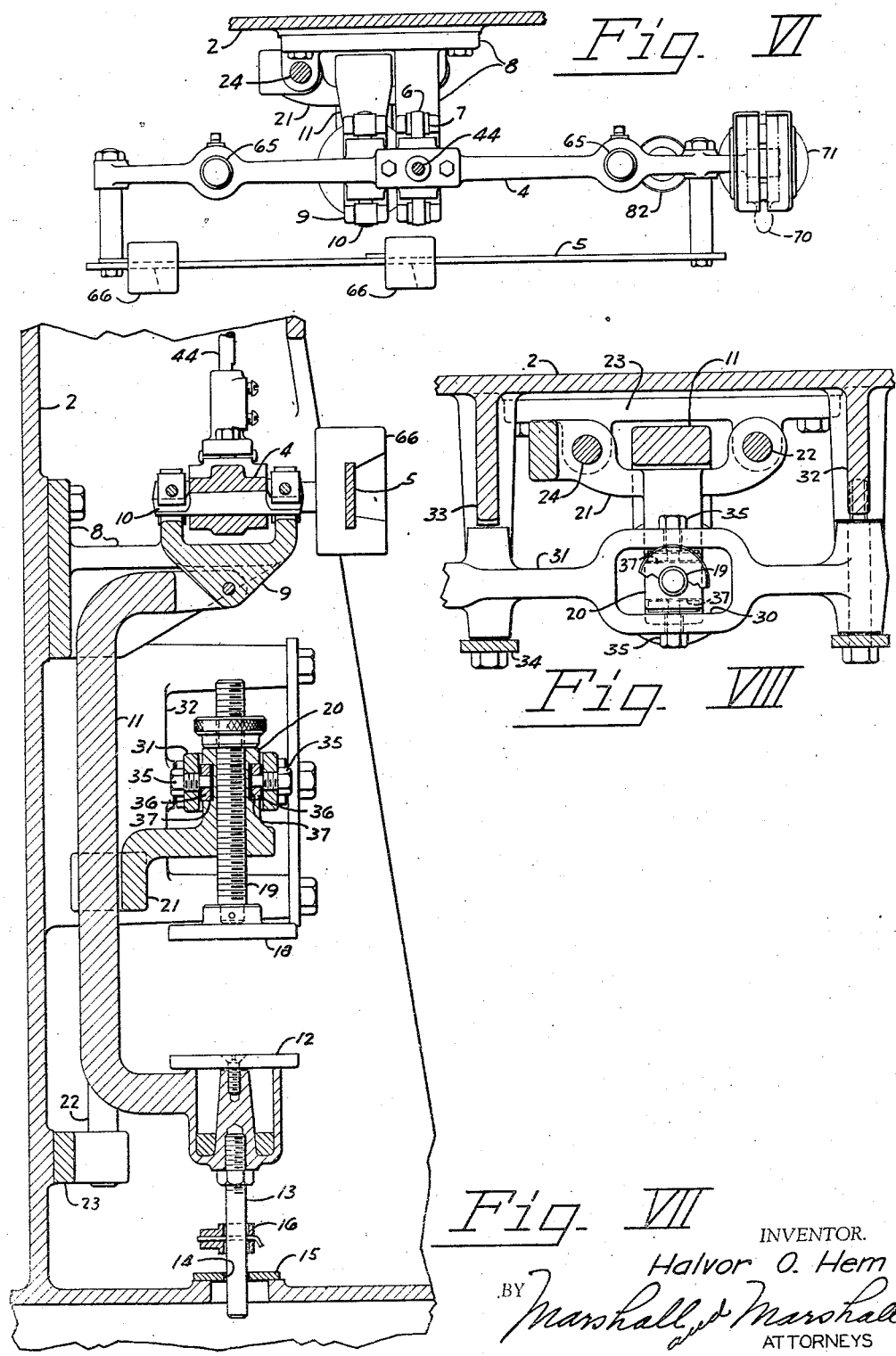
INVENTOR.
Halvor O. Hem
BY Marshall & Marshall
ATTORNEYS

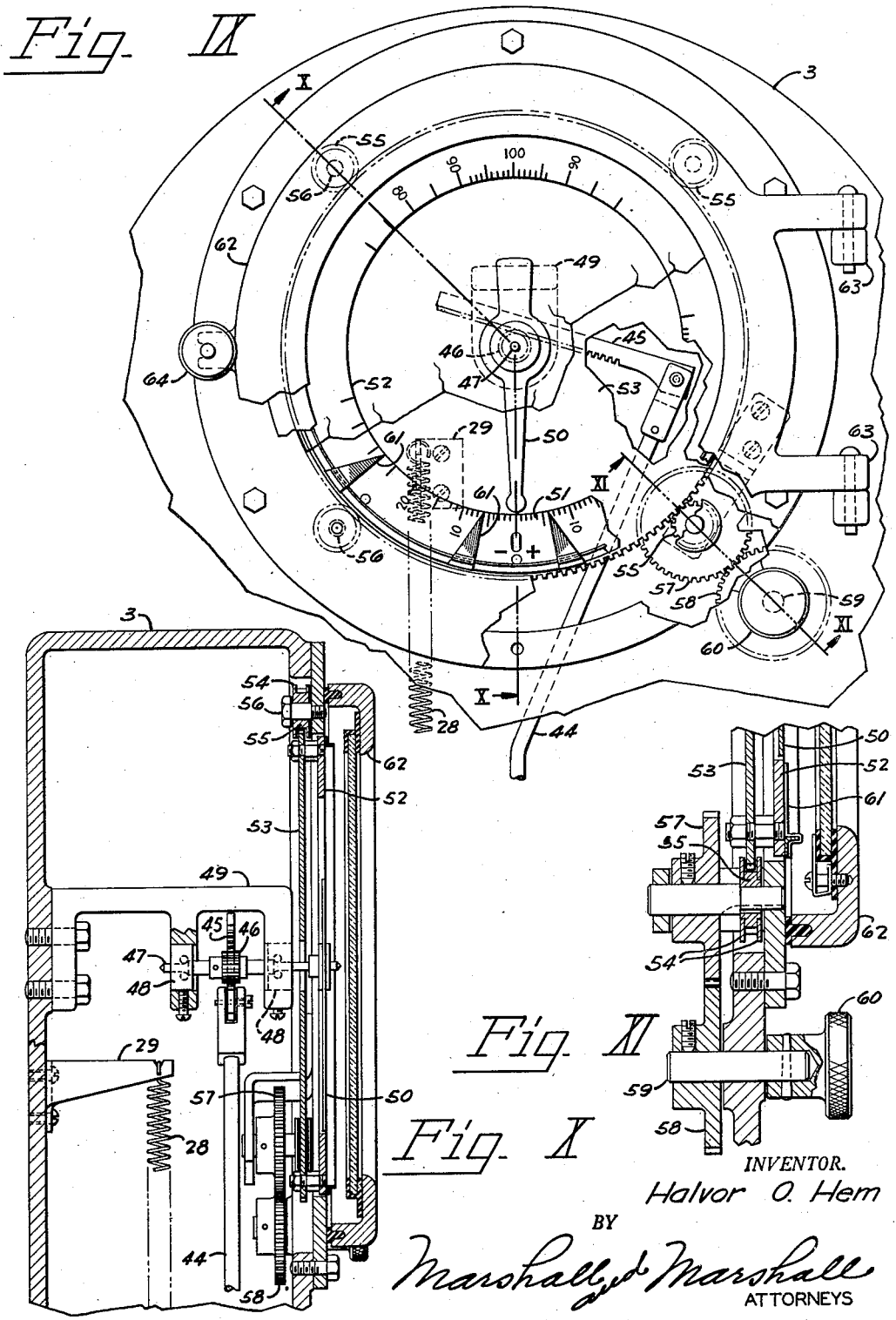

Patented Jan. 11, 1949

2,458,704

UNITED STATES PATENT OFFICE 2,458,704

SPRING TESTING SCALES

Halvor O. Hem, Toledo, Ohio, assignor to Toledo Scale Company, Toledo, Ohio, a corporation of New Jersey Application October 31, 1944, Serial No. 561,201

5 Claims. (Cl. 73—161)

This invention relates to spring testing scales and in particular to a scale adapted to quickly and accurately check the rate of a spring, i. e. the ratio of the change in load per unit change in length.

Spring testing scales have been built for production checking of springs. These scales usually check the load at a given height or length of the spring or the height under a given load. The two types of checking scales are equally satisfactory in that their results are comparative but each suffers from the defect that they are not readily adapted to quickly check the rate of a spring.

In many applications of springs it is more important that the spring have the correct rate than that it have a certain load at a certain height. In these applications an error in the length of a spring is compensated by an adjustment of the support of the spring but there is no easy way to correct for an error in the rate of a spring.

The principal object of this invention is to provide a spring checking scale which is adapted to quickly check the rate of a spring.

Another object of this invention is to provide a spring testing scale which is adapted to check the length of a spring under several applied loads.

Another object of the invention is to provide a spring testing scale adapted to check the length of a spring under several applied loads and to cancel out the deflection of a standard spring under the same loads so that the indicator indicates the error of the spring being tested.

These and other objects and advantages are attained in the structure shown in the drawings disclosing the invention.

Figure I is a front elevation of the spring testing scale.

Figure II is an enlarged front elevation, with parts broken away, showing the details of the lever system of the scale.

Figure III is a fragmentary detailed view of the weight applying mechanism as seen from the line III—III of Figure II.

Figure IV is a fragmentary end elevation of the main lever showing the stirrup and initial weight support carried thereon.

Figure V is a plan view of one of the weight supports.

Figure VI is a plan view of the main lever taken substantially along the line VI—VI of Figure II.

Figure VII is a fragmentary vertical section through the load receiver and load applying mechanism taken substantially along the line VII—VII of Figure II.

Figure VIII is a fragmentary horizontal section showing details of the load applying mechanism as seen from the line VIII—VIII of Figure II.

Figure IX is an enlarged front elevation, with parts broken away, showing details of the indicator structure.

Figure X is a generally vertical section of the indicating mechanism taken along the line X—X of Figure IX.

Figure XI is an enlarged fragmentary section of the chart positioning mechanisms taken along the line XI—XI of Figure IX.

These specific drawings and the accompanying description disclose a preferred form of the invention and are not intended to impose limitations on the claims.

According to the invention springs are checked for rate on a scale having a lever system adjusted to neutral equilibrium, an indicator operatively connected to the lever system, means for applying a succession of counterbalancing weights to the lever, and means for compressing or elongating a spring being tested definite amounts. The weights which are added to the lever system and the distances which the spring is compressed or elongated by the load applying mechanism are so related that when a master or exactly correct spring is being tested no deflection of the lever system occurs. If the spring under test departs from the norm, i. e. has an error, it does not compress or stretch to the same length under the given load as the standard spring and the deviation from the correct length is indicated by the indicating mechanism. Further, since the rate of the spring is the desired criteria, the indicator chart is made adjustably rotatable so that when the spring is lightly loaded with a small initial load the zero of the chart may be brought into registration with the indicator. Thereafter, when the greater loads are applied, the deviation of the indicator from the zero of the chart will indicate errors in rate of the spring independently of any error in the free length of the spring.

A scale suitable for checking springs in the manner outlined is shown in the drawings. The scale is contained within a cast frame 1 which, in front elevation, comprises a substantially rectangular base housing 2 and a generally triangular upper housing 3. The lever mechanism is contained within the rectangular housing 2 and the indicator is contained in the upper housing 3.

The lever system comprises a simple first class lever 4 provided with a beam 5 and having a fulcrum knife edge 6 near its center which rests on a V-bearing 7 carried in a fulcrum bracket 8. The fulcrum bracket 8 is secured to the upper part of the rear wall of the rectangular base housing 2. A stirrup 9 pivotally suspended from a load knife edge 10 of the lever 4 is pinned into the top of a C-shaped load receiver 11 (see Figure VII). The lower end of the C-shaped load receiver 11 is provided with a seat 12 and a depending rod 13. The rod 13 extends through a hole 14 in a plate 15 secured to the base of the housing 2 thus limiting any lateral motion of the C-shaped load receiver. To further restrict its motion, a check link 16 pivotally anchored in a stand 17 erected from the horizontal base 2, is provided to guide the lower end of the C-shaped load receiver. This arrangement with the check link 16 and the lever fulcrum pivot 6 on opposite sides of the vertical plane through the load receiver and the load knife edge 10 forms a modified form of Watt's linkage whose parts are so proportioned that the seat 12 has a precise vertical motion free of any horizontal components. As a result, any side thrust from a spring on the seat 12 has no vertical components and, therefore, introduces no error into the weighing.

A spring to be tested is positioned with its lower end on the seat 12 and its upper end beneath an upper seat 18. The upper seat 18 is attached to the lower end of a stud 19 threaded through a forwardly and upwardly extending neck 20 of a horizontally disposed J-shaped slide 21. One end of the slide 21 slides along a vertical rod 22 whose lower end is pinned into a bracket 23 secured to the lower portion of the rear wall of the housing 2. The upper end of the rod 22 is secured in the fulcrum bracket 8. The other side of the J-shaped slide 21 is mounted on and fastened to a vertical slide rod 24 whose lower end slides through a hole 25 in the bracket 23 and whose upper end extends through a hole in an ear 26 projecting forwardly from the fulcrum bracket 8. The extreme upper end of the slide rode 24 is provided with an arm 27 to the end of which a vertical tension spring 28 is attached. The tension spring 28 which is suspended from a bracket 29 contained within the upper triangular housing 3 partially overcomes the force of gravity acting on the slide to facilitate the manipulation thereof.

The neck 20 of the slide 21 extends upwardly through a bifurcated portion 30 of an operating lever 31. The operating lever 31 is fulcrumed in a bracket 32 extending forwardly from the rear wall of the housing 2. Movement of the lever 31 is guided and limited by another bracket 33 equipped with a cover plate 34 which surrounds the lever 31 on the opposite side of the bifurcated portion 30.

The neck 20 of the slide 21 and the operating lever 31 are operatively connected by a pair of screws 35 extending through the sides of the bifurcated portion 30 with their inner ends engaging slide blocks 36 carried in transverse slots 37 milled in the sides of the neck 20. Thus arcuate motion of the operating lever 31 is converted into vertical linear motion of the slide 21.

The free end of the operating lever 31 is provided with an axially slidable nonrotatable sleeve 38 which is urged toward an extended position by a compression spring 39 enclosed therein. The outer end of the sleeve 38 is provided with a tooth 40 adapted to engage any one of a series of notches 41 cut in the side of a bar 42 which is mounted on ears 43 formed integrally in a side of the housing 2. The notches 41 allow the slide 21 to be quickly and accurately positioned at the prescribed testing lengths of the spring. A separate bar 42 is provided for each type of spring to be tested.

Movement of the lever 4 in response to the force of the spring being tested is transmitted through a rod 44 adjustably secured to the lever 4 and which at its upper end pivotally carries a rack 45. The rack 45 meshes with and drives a pinion 46 mounted on an indicator shaft 47 which in turn is journaled in bearings 48 mounted in a bracket 49 extending forwardly from the rear wall of the triangular housing 3. An indicator 50 carried on the indicator shaft 47 cooperates with indicia 51 inscribed on an annular chart 52 to indicate the motion of the lever 4. The mechanical magnification is such that the indicia 51 indicate thousandths of an inch motion of the spring seat 12 of the load receiver 11. The annular chart is attached to but spaced from a circular disk 53 which is mounted between flanges 54 of a plurality of rollers 55 carried on studs 56. The rollers 54 are provided with teeth which mesh with teeth cut in the periphery of the disk 53. One of the rollers is carried on the axle of a gear 57 which meshes with another gear 58 mounted on a shaft 59. A portion of the shaft 59 extending outside the housing carries a knurled knob 60. By rotation of the knob 60 the chart 52 may be rotated so that its zero indicium may be brought into registration with the indicator 50 for any position of the lever 4. This adjustment facilitates the testing of springs whose free length and length under load may be variable but whose rate must meet an exact specification. The chart 52 is also provided with a plurality of tolerance indicating tabs 61. These tabs are slidably mounted on the periphery of the chart so that they may be readily set for any desired tolerance. A glazed enclosing cover 62 carried on hinges 63 and locked by a screw 64 is provided to seal the indicator opening in the triangular housing 3.

The lever 4 and the indicating mechanism operatively connected thereto are adjusted to neutral equilibrium by means of vertical adjustment of a pair of cylindrical weights 65 carried in the arms of the lever 4. Poises 66 slidably mounted on the beam 5 and a weight hanger 67 suspended from a stirrup 68 carried on a knife edge 69 are provided to counterbalance the force exerted by the spring. Counterweights 70, 71 and 72 are provided for the weight hanger 67. The weights 71 and 72 when not carried on collars 73 of the weight hanger 67 rest on shelf-like supports 74 extending laterally from a slide 75. The slide 75 adapted to successively deposit the weights 71 and 72, is guided for vertical motion through a bracket 76 and incorporates a rack along one side which meshes with a gear 77 operatively connected to a crank 78. The slide is held in position by a detent formed by a steel ball 79 mounted in the lower end of the bracket 76 and urged by a spring 80 into notches 81 cut in the slide 75.

A dashpot 82 mounted on a shelf 83 has its plunger rod 84 pivotally connected to the lever 4 and serves to control the oscillation of the lever system and the indicator.

This device permits rapid checking of compression springs with two different load increments and indicates the deviation from the prescribed changes in length under the load increments. A starting or initial load is provided by the weight 70 and the position of the poises 66 so that when the tooth 40 at the end of the operating lever 31 is engaged in the uppermost of the notches 41 and an average spring is in position between the seats 12 and 18 the lever 4 will be horizontal. The weight 71 is then lowered onto the weight hanger 67 and the operating lever moved down to the second notch 41. The counterbalancing effect of the weight 71 and the distance between the first two of the notches 41 is proportioned so that with a correct spring the weight 71 exactly counterbalances the increase in load due to the incremental decrease in length so that there is no movement of the lever 4 or indicator 50. Likewise, the weight 72 and the distance between the last two notches 41 correspond to each other. With a sample spring the load due to the weights and the change in force due to compression may not balance each other. In such case the lever system will deflect in one direction or the other until the force exerted by the spring equals the force exerted by the weights and the indicator 50 will indicate the error in length. The normal procedure, inasmuch as the free length and the loaded length of the spring is not of material interest, is to load the spring with the load applying lever 31 in its upper position with the counterweight 70 and the poises 66 and then rotate the chart by means of the knob 60 until the zero of the chart registers with the indicator. The spring is then compressed to the next length and the first weight added. The resulting movement of the indicator indicates the error in incremental length of the spring. The allowable tolerance on this error in length is indicated by the tabs 61. If the spring is within tolerance on the first addition of load the lever 31 is moved to the bottom position, the weight 72 is added and the error in length is noted by any additional movement of the indicator. Inasmuch as the last measurement includes whatever error is present during the first addition of weight the overall tolerance is ordinarily made somewhat greater.

This device provides a simple, quick means for measuring the uniformity of production springs. The invention provides a structure for quickly loading the springs with successive load increments and for compressing the springs the corresponding incremental length and for indicating any deviation from the prescribed changes in length of the tested spring from its normal specification.

Having described the invention, I claim:

1. Mechanism for testing the rate of a spring by comparison with the known rate of a standard spring, comprising, in combination, a lever, a spring support member pivotally connected to said lever, a series of weights for applying predetermined moments to said lever, an indicator for indicating movement of said lever and means for varying the load supporting length of a spring acting on the spring support through distances equal to the variations in length of a standard spring required to counterbalance the moments applied to said lever by each of said weights.

2. Mechanism for testing the rate of a spring by comparison with the known rate of a standard spring, comprising, in combination, a lever, a spring support member operatively connected to said lever, a series of weights of known magnitude for applying predetermined moments to said lever, an indicator for indicating movement of said lever relative to a balanced condition, and a second spring supporting member mounted independently of said lever, means for adjusting said support members to a plurality of predetermined positions relative to each other for varying the load supporting length of said spring between said members through distances equal to the variations in length of a standard spring required to counterbalance the moments applied to said lever by said weights.

3. Mechanism for testing the rate of a spring by comparison with the known rate of a standard spring, comprising, in combination, a lever, a spring support member operatively connected to said lever, a second spring support member mounted independently of said lever and means for adjusting said support members to a plurality of predetermined positions relative to each other for varying the load supporting length of a spring under test supported between said members and thus the moment applied to said lever by the spring under test, a lever position indicator and a series of weights corresponding to the positions of said spring support members and applicable to said lever for counterbalancing the moments applied to said lever by the spring under test at its various lengths.

4. Mechanism for testing the rate of a spring by comparison with the known rate of a standard spring, comprising, in combination, a lever, a spring support member pivotally connected to said lever, a second spring support member mounted independently of said lever and movable to a plurality of predetermined positions relative to the first spring support member for varying the load supporting length of a spring under test supported between said members and thus the moment applied to said lever by the spring under test, a lever position indicator and a series of weights corresponding to the positions of said second spring support member and applicable to said lever for counterbalancing the moments applied to said lever by the spring under test at its various lengths.

5. In a device of the class described, in combination, a lever, an indicator for indicating movement of said lever, a spring support member operatively connected to said lever for transmitting thereto forces created by stresses of a spring to be tested, a second spring support member mounted independently of said lever, means for moving said spring support members relative to each other for stressing said spring successively through a series of predetermined distances, a series of weights each being related to one of said distances and being applicable to said lever to exert force thereon opposite in moment to the force exerted thereon by the spring under test, each of said weights having a magnitude selected to exert a moment equal to the moment exerted by a standard spring when stressed to an equivalent predetermined distance.

HALVOR O. HEM.

REFERENCES CITED

The following references are of record in the file of this patent:

UNITED STATES PATENTS

| Number | Name | Date |
|---|---|---|
| 2,170,197 | Gumprich | Aug. 22, 1939 |

FOREIGN PATENTS

| Number | Country | Date |
|---|---|---|
| 100,853 | Great Britain | July 20, 1916 |
| 400,442 | Germany | Aug. 9, 1924 |